United States Patent
Mi et al.

(10) Patent No.: US 8,757,854 B2
(45) Date of Patent: Jun. 24, 2014

(54) FRONT TURN LIGHT ON REAR VIEW MIRROR OF MOTORCYCLE

(75) Inventors: Zhenxing Mi, Shanghai (CN); Jun Ye, Shanghai (CN)

(73) Assignee: Magna Mirrors (Taicang) Automotive Technology Co., Ltd. (CN)

( * ) Notice: Subject to any disclaimer, the term of this patent is extended or adjusted under 35 U.S.C. 154(b) by 0 days.

(21) Appl. No.: 13/263,014

(22) PCT Filed: Sep. 7, 2010

(86) PCT No.: PCT/CN2010/076660
§ 371 (c)(1),
(2), (4) Date: Dec. 1, 2011

(87) PCT Pub. No.: WO2011/095003
PCT Pub. Date: Aug. 11, 2011

(65) Prior Publication Data
US 2012/0287656 A1  Nov. 15, 2012

(30) Foreign Application Priority Data
Feb. 2, 2010  (CN) ...................... 2010 2 0106643 U

(51) Int. Cl.
*B62J 6/00* (2006.01)
(52) U.S. Cl.
USPC ............................ 362/473; 362/494; 362/540
(58) Field of Classification Search
USPC ......... 362/473–476, 494, 540, 544, 545, 492, 362/800
See application file for complete search history.

(56) References Cited

U.S. PATENT DOCUMENTS

| | | | | |
|---|---|---|---|---|
| 6,049,271 A * | 4/2000 | Chu | ............................... | 362/473 |
| 7,048,420 B2 * | 5/2006 | Arakawa | ........................ | 362/494 |
| 7,281,832 B2 * | 10/2007 | Ishida et al. | ................... | 362/544 |
| 8,262,267 B2 * | 9/2012 | Tsuda et al. | ................... | 362/494 |
| 2004/0145903 A1 * | 7/2004 | Arakawa | ........................ | 362/494 |

FOREIGN PATENT DOCUMENTS

| | | |
|---|---|---|
| CN | 2455535 | 10/2001 |
| CN | 2468826 | 1/2002 |
| CN | 2582941 | 10/2003 |
| CN | 1521051 | 8/2004 |
| CN | 201291950 | 8/2009 |
| WO | 2011095003 | 8/2011 |

* cited by examiner

*Primary Examiner* — Bao Q Truong
(74) *Attorney, Agent, or Firm* — Blue Filament Law PLLC; Avery N. Goldstein

(57) ABSTRACT

The present invention relates to a front turn light on rear view mirror of motorcycle, which includes a rear view mirror housing and a front turn light mounted at the front part of the rear view mirror housing The front turn light has a LED light source(s) and a condenser lens(es) which is mounted in front of the LED light source(s) The front turn light further includes a front turn light face-plate and a front turn light housing which is mounted on the front turn light face-plate to form an internal cavity between the front turn light housing and the front turn light face-plate, where the LED light source(s) is mounted in the internal cavity and the condenser lens(es) is mounted in the front turn light face-plate, the front turn light is mounted inside the rear view mirror housing.

9 Claims, 2 Drawing Sheets

FRONT TURN LIGHT ON REAR VIEW MIRROR OF MOTORCYCLE

FIELD OF TECHNOLOGY

The present invention relates to the field of devices indicating vehicle forward direction, and more particularly, to the field of front turn lights for motorcycles, especially, to a front turn light on the rear view mirror of motorcycle.

DESCRIPTION OF RELATED ARTS

The front turn lights of motorcycle are used as the auxiliary front signal lights on the vehicle (the required optical properties of the turn signal lights of motorcycle are dictated by regulations ECE R50&FMVSS 108). During the process of driving, the front turn lights can better convey the driver's driving intentions to other vehicles and pedestrians to effectively avoid traffic safety problems caused by insufficient transmission of information.

However, the current front turn lights utilize bulbs as the light sources, where the expected life of the bulbs is no more than 2000 hours; and the bulbs are often required to be replaced cumbersomely during the life of the motorcycle. Light emitting diodes (LED) is a maturing technology for light sources, and has been used broadly in various fields. However, the use of LED in the front turn light on rear view mirror of motorcycle has shortcoming in that the luminosity of the LED as the light source is relatively low for the comparable cost, and provides insufficient light to meet the requirements of the regulations for the front turn lights.

SUMMARY OF THE INVENTION

Aspects of the present invention generally pertain to providing a front turn light on the rear view mirror of motorcycle The front turn light on the rear view mirror of motorcycle has a novel and beautiful design, a concise structure and a low use cost, that can be simply maintained and still meet the optical requirements for the turn signal lights, and therefore the present invention is suitable for large-scale popularization.

In order to realize the above aims, the front turn light on the rear view mirror of motorcycle of the present invention comprises a rear view mirror housing and a front turn light mounted at the front part of the rear view mirror housing, the front turn light is provided with a LED light source(s) and a condenser lens(es) which is mounted in front of the LED light source(s).

In a further aspect, the front turn light further comprises a front turn light face-plate and a front turn light housing which is mounted on the front turn light face-plate so as to form an internal cavity between the front turn light housing and the front turn light face-plate, the LED light source(s) is mounted in the internal cavity and the condenser lens(es) is amounted in the front turn light face-plate.

In yet another aspect, the front turn light housing is welded on the front turn light face-plate.

In yet another aspect, a window is provided in the front part of the rear view mirror housing, and the front turn light face-plate is positioned in the window.

In yet another aspect, the front turn light face-plate is at least partially transparent.

In yet another aspect, the front turn light further comprises a circuit board on which the LED light source(s) is amounted, and the circuit board is amounted in the internal cavity.

In yet another aspect, the front turn light further comprises a decorative reflector plate which is provided between the circuit board and the front turn light face-plate and exposes the LED light source(s).

In yet another aspect, the decorative reflector plate is an aluminized decorative plate.

In yet another aspect, the decorative reflector plate and the front turn light housing are removeably attached.

In a further aspect, the front turn light is mounted inside the rear view mirror housing.

In yet another aspect, the front turn light and the inner wall of the rear view mirror housing are removeably attached.

The beneficial effects of the present invention are as follows:

The present invention uses a light-emitting diode (LED) as the light source which is provided with the condenser lens(es) to enhance the luminosity, so as to meet the optical requirements of the related regulations (ECE R50 and FMVSS 108), therefore the present invention has a novel design, a concise structure a low use cost, and can be maintained simply, therefore the present invention is suitable for large-scale popularization.

The front turn light face-plate of the present invention can be designed uniquely, to achieve the beautiful and decorative purposes;

The present invention is provided with the decorative reflector plate, which can further enhance the luminosity, and at the same time, further increase the decorative effect;

The present invention has the front turn light housing and the front turn light face-plate joined together by way of welding, to achieve the sealing of the lamp.

DETAILED DESCRIPTION OF THE PREFERRED EMBODIMENT

In order to understand the technical content of the present invention clearly, the present invention is further exemplified by reference to the following embodiments.

Figure 1:
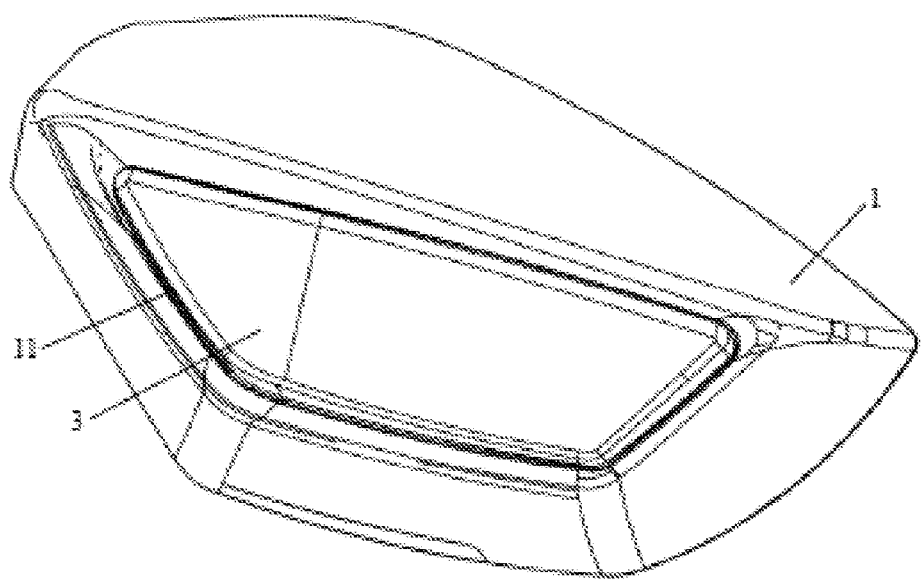
FIG. 1 is a schematic three-dimensional view of one embodiment of the present invention.
Figure 2:
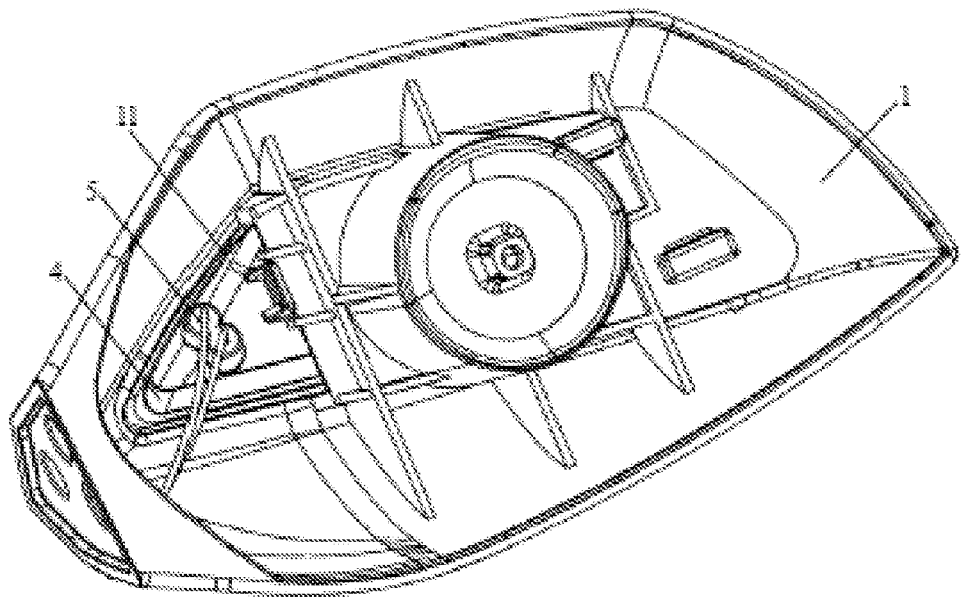
FIG. 2 is another schematic three-dimensional view of the embodiment shown in FIG. 1.
Figure 3:
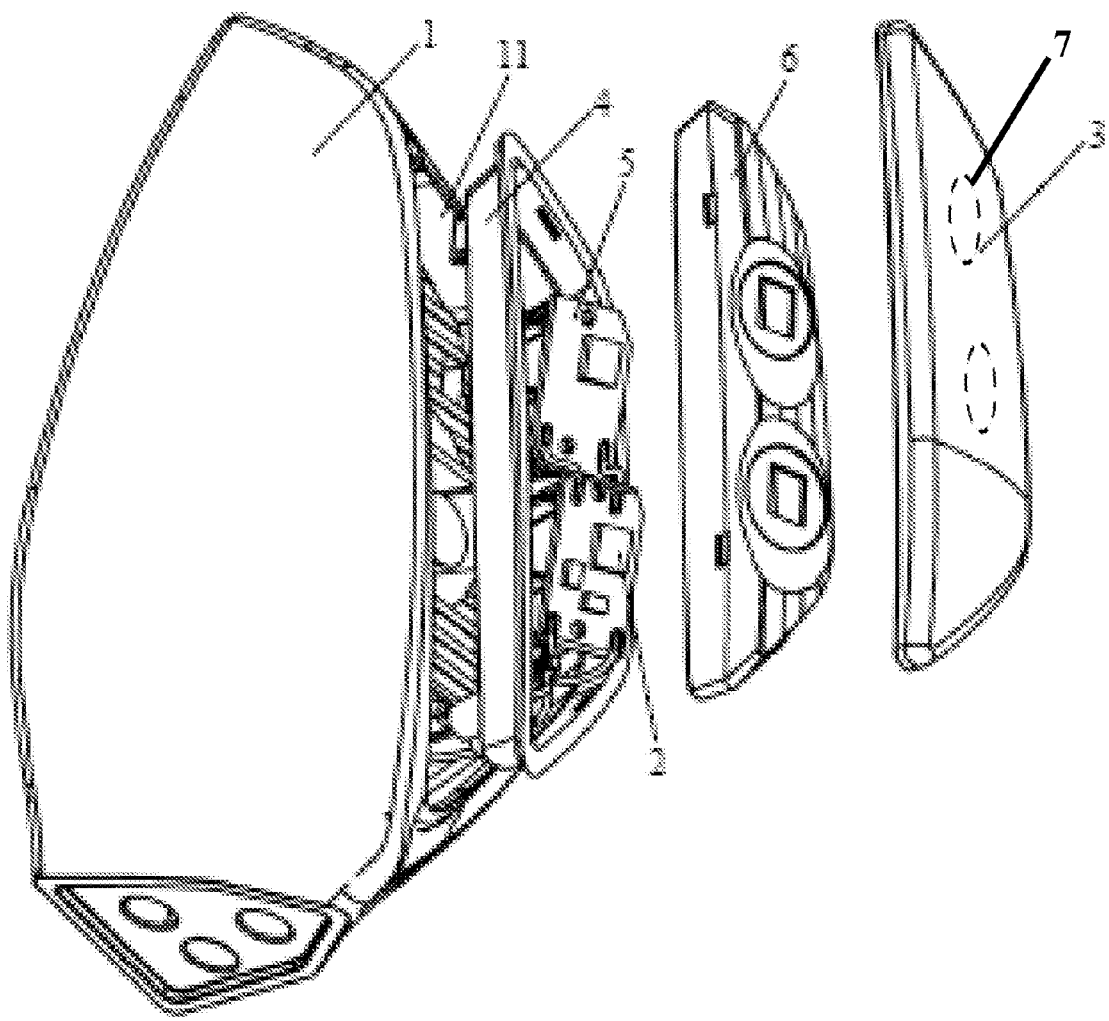
FIG. 3 is a schematic view of assembling the embodiment shown in FIG. 1.

Please refer to FIGS. 1-3, the front turn light on rear view mirror of motorcycle of the present invention includes a rear view mirror housing 1 and a front turn light mounted at the front part of the rear view mirror housing 1, the front turn light is provided with a LED light source(s) 2 and a condenser lens(es) which is mounted in front of the LED light source(s). The LED light source can be one or more, and the condenser lens also can be one or more. In an embodiment of the present invention, the front turn light is provided with two LED light sources 2 and two condenser lenses, each condenser lens is provided in front of each LED light source 2. The material of the condenser lens uses a poly(methyl methacrylate) (PMMA) material. Of course, the material of the condenser lens can be other suitable materials.

Preferably, the front turn light further comprises a front turn light face-plate 3 and a front turn light housing 4 which is mounted on the front turn light face-plate 3 so as to form an internal cavity between the front turn light housing 4 and the front turn light face-plate 3, the LED light source(s) 2 is mounted in the internal cavity and the condenser lens(es) is mounted in the front turn light face-plate 3. In an embodiment of the present invention, the condenser lenses are integrated with the front turn light face-plate 3 as a whole.

In the embodiment of the present invention, the front turn light housing 4 is welded on the front turn light face-plate 3.

In the embodiment of the present invention, a window 11 is provided in the front part of the rear view mirror housing 1, and the front turn light face-plate 3 is positioned in the window 11.

Preferably, the front turn light face-plate 3 is at least partially transparent. In an embodiment of the present invention, the front turn light face-plate 3 is completely transparent, and adopts the acrylic material (PMMA).

Preferably, the front turn light further includes a circuit board 5 on which the LED light source(s) 2 is mounted, and the circuit board 5 is mounted in the internal cavity. In an embodiment of the present invention, the circuit board 5 is a printed circuit board (PCB).

Preferably, the front turn light further includes a decorative reflector plate 6 which is provided between the circuit board 5 and the front turn light face-plate 3 and exposes the LED light source(s) 2. In an embodiment of the present invention, the decorative reflector plate 6 is an aluminized decorative plate.

Preferably, the decorative reflector plate 6 is removably joined with the front turn light housing 4. In an embodiment of the present invention, the aluminized decorative plate is removeably joined with the front turn light housing 4.

Preferably, the front turn light is mounted inside the rear view mirror housing 1. In an embodiment of the present invention, the front turn light is removeably joined with the inner wall of the rear view mirror housing 1.

The present invention mentioned above uses two light-emitting diodes (LEDs) as the light source, the aluminized decorative plate to shield the PCB circuit board, the condenser lenses integrated with the transparent front turn light face-plate 3 as a whole to enhance the luminosity, so as to meet the optical requirements of the regulations (ECE R50 and FMVSS 108), while at the same time the aluminized decorative plate and the condenser lens can cooperate with the unique shape of the front turn light face-plate 3 to provide a very good decorative effect.

The present invention uses the LED light source(s) 2 as the light source of the front turn lights mounted on the rear view mirrors of motorcycle, and enhances the luminosity of the light emitted by the LED light source(s) 2 with the condenser lenses integrated with the transparent front turn light face-plate 3, so as to be able to not only guarantee meeting the optical requirements of the turn signal lights, but also cooperate with the unique shape of the front turn light face-plate 3 to provide a very good decorative effect. The present invention provides a good technical solution for using the LED light source(s) 2 to manufacture the front turn lights for motorcycles.

Therefore, the present invention adopts the light-emitting diode (LED) technology to meet the functional requirements of the turn signal lights through the luminosity-enhancing property of the condenser lens made from the PMMA material and combines the front turn light face-plate (LENS) 3 with the front turn light housing (HOUSING) 4 joined together through a sweat soldering method, to achieve a watertight seal and meet the performance requirements of the products The application and design of the unique and novel technology of the product indicates a completely novel method for the designs of future similar products.

In summary, the front turn light on rear view mirror of motorcycle of the present invention has a novel and beautiful design, a concise structure and a low use cost, can be maintained simply and meet the optical requirements of the turn signal lights, and therefore the present invention is suitable for large-scale popularization.

In the present specification, the present invention has been described according to the particular embodiments. But it is obvious that these embodiments can be modified or changed without departure from the spirit and scope of the present invention. Therefore, the specification and drawings described above are exemplary only and not intended to be limiting.

I claim:

1. A front turn light on a rear view mirror of a motorcycle, comprising a rear view mirror housing and the front turn light mounted at a front part of the rear view mirror housing, the front turn light being provided with a LED light source(s), a circuit board to which the LED light source(s) is mounted, a front turn light face-plate, and a condenser lens(es) which is mounted in front of the LED light source(s); and wherein the front turn light further comprises a decorative reflector plate which is provided between the circuit board and the front turn light face-plate and exposes the LED light source(s).

2. The front turn light on the rear view mirror of the motorcycle according to claim 1, wherein the front turn light further comprises a a front turn light housing which is mounted on the front turn light face-plate so as to form an internal cavity between the front turn light housing and the front turn light face-plate, the LED light source(s) is mounted in the internal cavity and the condenser lens(es) is mounted in the front turn light face-plate.

3. The front turn light on the rear view mirror of the motorcycle according to claim 1, wherein the front turn light housing is welded on the front turn light face-plate.

4. The front turn light on the rear view mirror of the motorcycle according to claim 1, wherein a window is provided in a front part of the rear view mirror housing, and the front turn light face-plate is positioned in the window.

5. The front turn light on the rear view mirror of the motorcycle according to claim 1, wherein the front turn light face-plate is at least partially transparent.

6. The front turn light on the rear view mirror of the motorcycle according to claim 1, wherein the decorative reflector plate is removeably joined to the front turn light housing.

7. The front turn light on the rear view mirror of the motorcycle according to claim 1, wherein the front turn light is mounted inside the rear view mirror housing.

8. The front turn light on the rear view mirror of the motorcycle according to claim 7, wherein the front turn light is removably joined the inner wall of the rear view mirror housing.

9. The front turn light on the rear view mirror of the motorcycle according to claim 1, wherein the decorative reflector plate is an aluminized decorative plate.

* * * * *